United States Patent [19]

Task

[11] 4,258,994
[45] Mar. 31, 1981

[54] HIGH CONTRAST OPTICAL FINGERPRINT RECORDER

[76] Inventor: Harry L. Task, 5513 Snowbank Cir., Dayton, Ohio 45431

[21] Appl. No.: 63,875

[22] Filed: Aug. 3, 1979

[51] Int. Cl.$^3$ .............................................. G03B 29/00
[52] U.S. Cl. ........................................ 354/75; 355/71
[58] Field of Search ...................... 355/40, 43, 39, 18, 355/71; 354/105, 109, 75

[56] References Cited

U.S. PATENT DOCUMENTS

| | | | |
|---|---|---|---|
| 2,579,961 | 12/1951 | Popma | 354/109 X |
| 3,422,446 | 1/1969 | Riggles, Jr. | 355/39 X |
| 3,482,498 | 12/1969 | Becker | 354/75 |
| 3,702,731 | 11/1972 | Wood, Jr. | 354/105 X |

*Primary Examiner*—Richard A. Wintercorn
*Attorney, Agent, or Firm*—Donald J. Singer; Casimer K. Salys

[57] ABSTRACT

An apparatus for detecting contact between an object and the surface of a body, by utilizing various indices of refraction so that electromagnetic energy reaches a detector system only when there is optical contact. A body of transmissive material is irradiated with electromagnetic energy. That portion of the energy which enters the body through a first boundary surface is refracted, thereby striking the body surface leading to the detection system at angles of incidence sufficient to cause total reflection at that surface. Similarly, electromagnetic energy which passes through the body, strikes the object on the opposite side, and reenters the body is refracted upon reentry and totally reflected at the surface leading to the detector system. Contact between the object and the contact detecting surface produces diffusive reflection within the body at all points of actual contact. The incidence angle between the diffusive electromagnetic energy at each point of contact and the surface leading to the detection system is sufficiently low to permit passage of electromagnetic energy outward through surface and onto the detection system. Since the contact points and the detection system are geometrically related, contact locations or patterns may be recognized when they are being sought.

8 Claims, 6 Drawing Figures

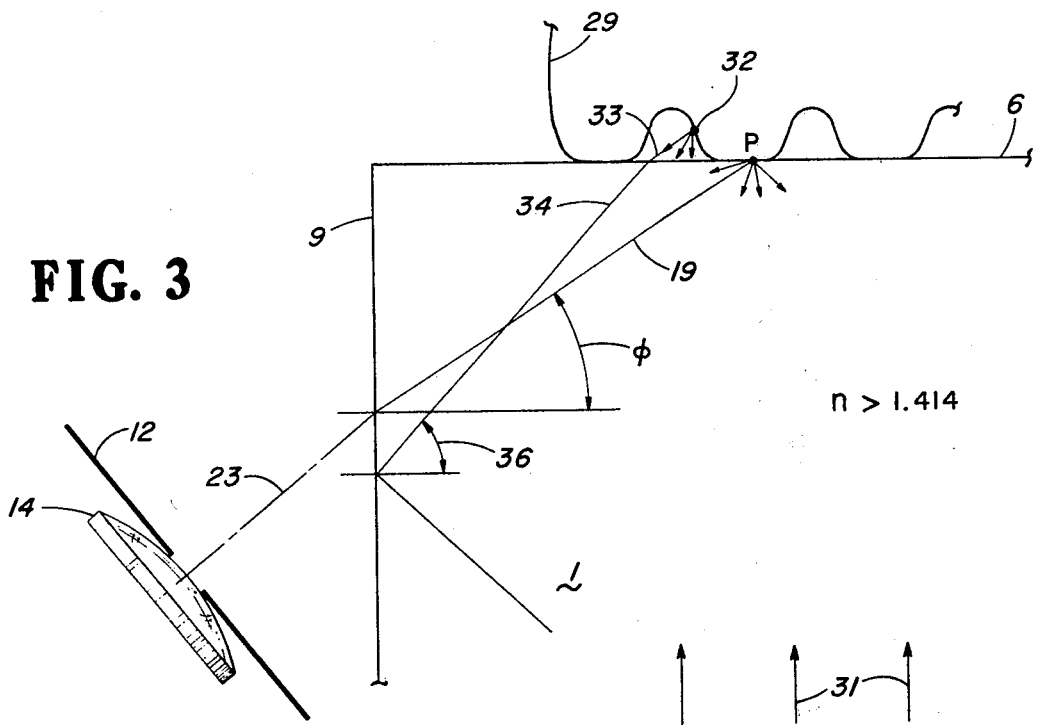
FIG. 3
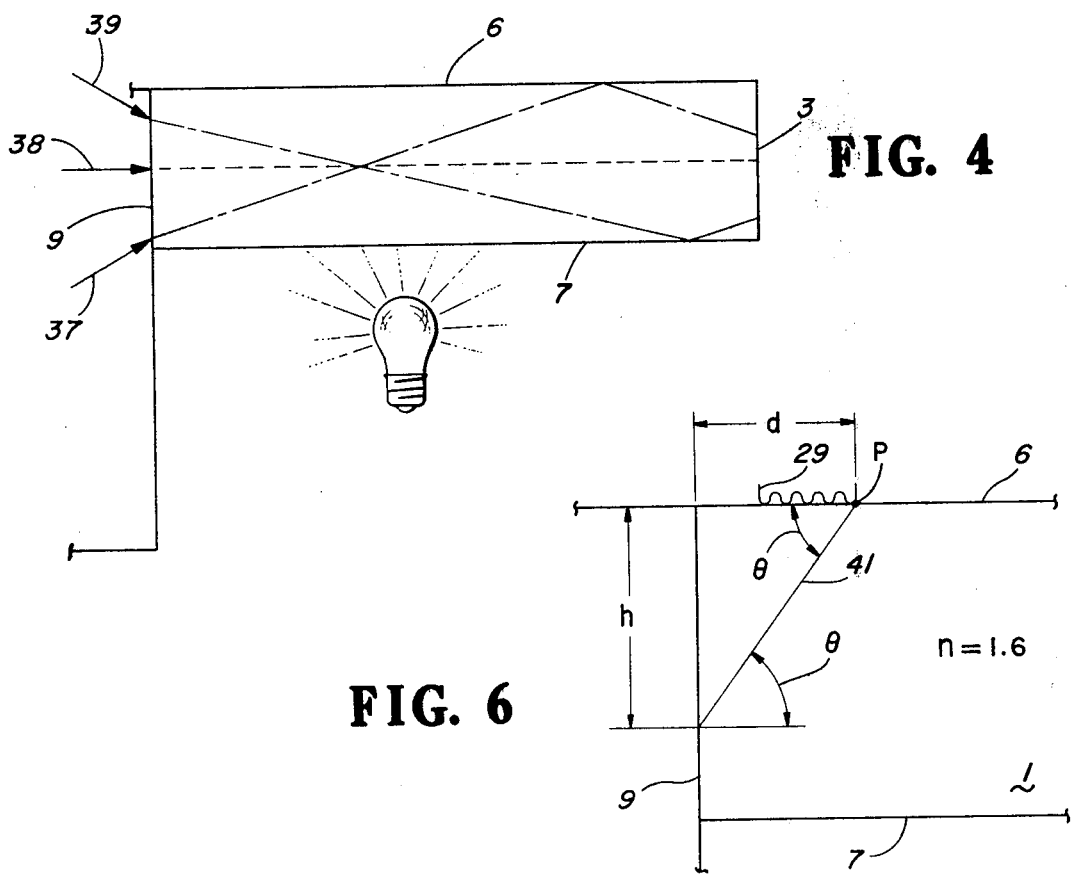
FIG. 4
FIG. 6

HIGH CONTRAST OPTICAL FINGERPRINT RECORDER

RIGHTS OF THE GOVERNMENT

The invention described herein may be manufactured and used by or for the Government of the United States for all governmental purposes without the payment of any royalty.

BRIEF SUMMARY

The present invention is directed to an apparatus and method for utilizing indices of refraction to detect points of contact between an object and a surface. The difference between the indices of refraction of the apparatus body and the exterior, at a boundary surface illuminated by electromagnetic energy, causes the refraction of the incident electromagnetic energy entering the body, so that all the electromagnetic energy within the body is totally reflected at the surface leading to the detector system. In like fashion, any electromagnetic energy entering through a contact surface, substantially opposite the illuminated surface, undergoes refraction and subsequent reflection at surface leading to the detector system. Bringing a nominally diffusive reflective object into optical contact with the contact surface produces diffuse reflection of electromagnetic energy at each point of contact. Since diffusive electromagnetic energy radiates from within the body, some of the energy intersects the surface leading to the detector system at an angle of incidence less than the critical angle. Though refracted, the electromagnetic energy passes through the surface and is received by the detector system.

Since each point of contact between the object and contact surface creates a diffusive radiator, regions of contact, or patterns, are recognizable by the detector system. If the electromagnetic energy detector system is capable of recording the contact pattern, the surface pattern on a curvilinear object can be ascertained by rolling the object over the contact surface. The pattern of electromagnetic energy reaching the detector system corresponds to the contact pattern both in location and duration.

DESCRIPTION OF THE DRAWINGS

FIG. 3 contains a schematic showing the way luminous energy is affected by the apparatus in FIG. 1.

FIG. 4 schematically depicts part of the apparatus in FIG. 1 to show the opaque background concept.

FIG. 6 is a schematic of the apparatus, illustrated in a form showing geometric relationships.

DETAILED DESCRIPTION

The invention as disclosed and embodied herein is directed to an apparatus for detecting contact between an external object and a boundary surface. A further variation contemplates the recording or recognition of the contact pattern. In either case, the fundamental concepts are those of refraction of electromagnetic energy at boundary surfaces of different refractive indices, and total internal reflection of electromagnetic waves at boundary surfaces joining materials of different indices when the critical angle is exceeded.

For purposes of illustration in the context of a recognized application coinciding with a segment of the electromagnetic spectrum generally understood, the visual band, the invention will be described in terms of a fingerprint recognition device. Clearly though, the underlying concepts disclosed herein are, as those skilled in the art will recognize, far broader in scope.

Figure 1:
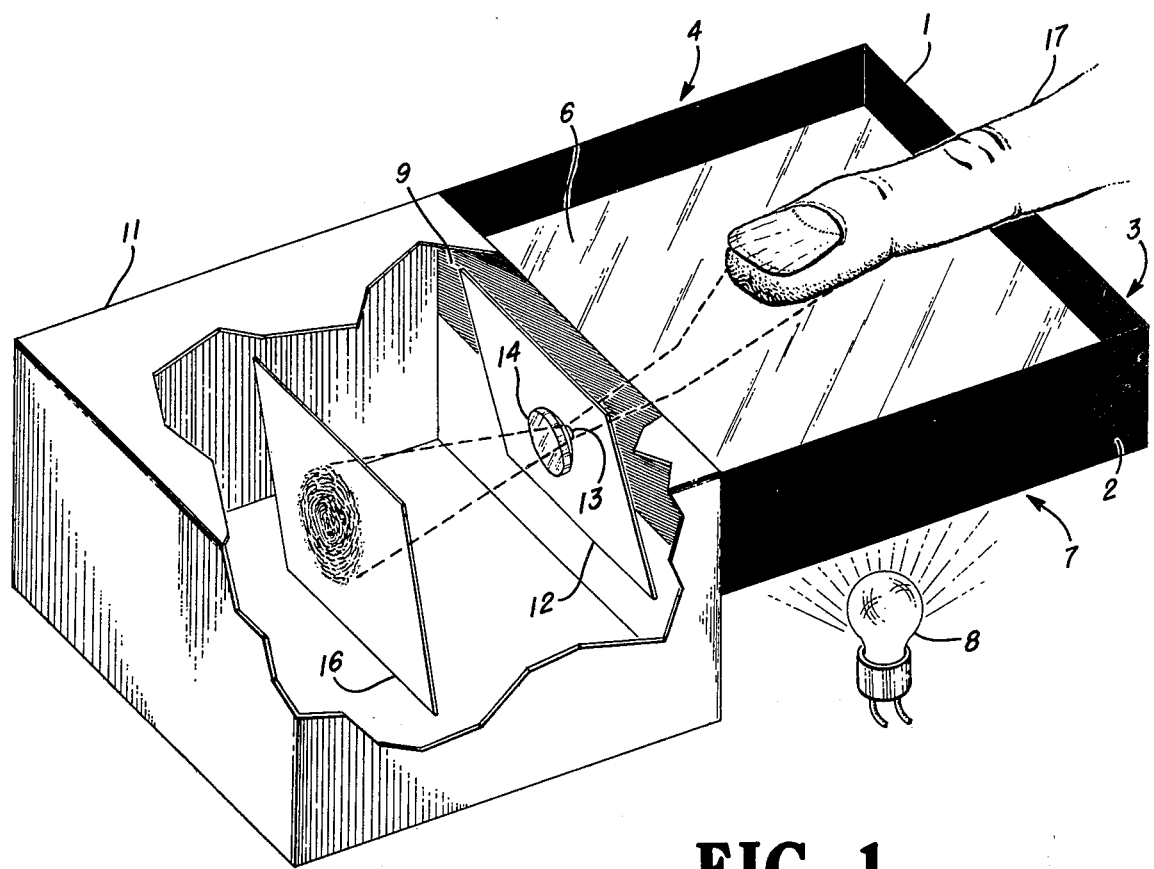
FIG. 1 schematically depicts one embodiment of the invention, in the form of a visual wavelength fingerprint recorder.

Turning to the embodiment of the invention, it appears schematically in FIG. 1 as an apparatus for detecting the presence of finger contact and recognizing the pattern generally known as a fingerprint. As shown, the structure includes an optically transparent block, 1, of a material such as glass or plastic with a relatively large index of refraction. Edge surfaces 2, 3 and 4 of block 1 are covered with opaque, light absorbent coatings. Contact boundary surface 6 and lower boundary surface 7 are polished and clear. A source of luminous energy, typified by light bulb 8, is situated beneath lower boundary surface 7. Edge surface 9 of block 1 is also polished and clear, though it appears to be opaque in the figure by the reflected image of surface 3.

Detection assembly 11 is attached to block 1 so that luminous energy from any source excepting surface 9 is excluded from the assembly interior. Luminous energy entering from surface 9 is limited by opaque aperture plane 12 to that which passes through aperture 13. Those luminous energy rays which pass through aperture 13 are focused by lens 14 onto image plane detector 16.

When nothing is in contact with contact surface 6, luminous energy introduced by source 8 enters through boundary surface 7 and exits boundary surface 6. Image plane detector 16 observes the blackness of opaquely covered surface 3. On the other hand, when an object such as finger 17 is brought into optical contact with surface 6, the points of contact, whether singular or in the form of a relief pattern, appear illuminated at image plane 16. Analysis or recording of the pattern is readily accomplished. The phenomenon and its mechanisms will become clearer from the ensuing description.

Figure 2:
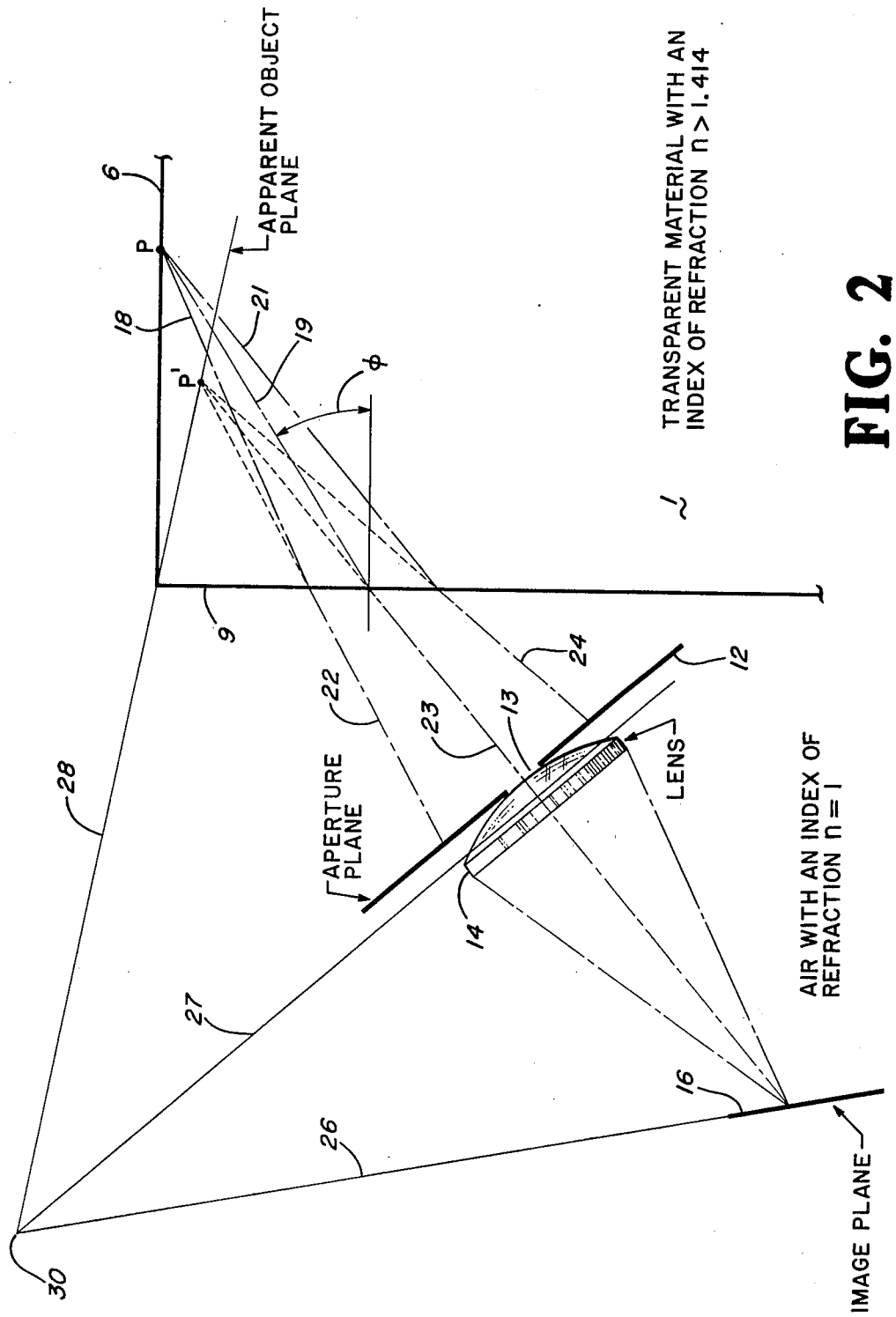
FIG. 2 is a cross-sectional schematic of the optical configuration embodied in FIG. 1.

Attention is now directed to FIG. 2, where a portion of the embodiment in FIG. 1 appears in the cross-section. The transparent block, 1, is assumed to have an index of refraction greater than 1.414. The exterior medium is air with an index n=1. If, for purposes of this example, luminous energy originates at point P on contact surface 6 of block 1, the rays of luminous energy projected in the general direction of interest are shown by lines 18, 19 and 21. Following Snell's law at surface 9 the lines are refracted to those designated 22, 23 and 24, respectively. The rays are obstructed by aperture plane 12 so that only those passing through aperture 13 are focused by lens 14 onto image plane detector 16. Thus, angle $\phi$ for any point P must be less than the critical angle defined by the indices of refraction for block 1 and the air outside.

Continuing with FIG. 2, the structures are also constrained to the Scheimpflug condition if image plane 16 is to be in focus. Namely, projection 26 of image plane detector 16, projection 27 from the plane of lens 14, and projection 28 of the apparent object plane, must intersect at point 30. Point P' must be in the apparent object plane, as shown, and may be located by projecting lines 22, 23 and 24 to their point of intersection.

FIG. 3 is a schematic geometrically similar to FIG. 2. In this figure relief pattern 29 is shown to be in physical contact with surface 6 of block 1. Luminous energy 31 introduced into block 1 from source 8 illuminates the whole relief pattern. All the illuminated points diffusely reflect the incident luminous energy. In the case of point P, in actual optical contact with surface 6 of block 1, the luminous energy is reflected prior to leaving the block and there scatters light in all directions into the block, unconstrained by the relative indices of refraction at surface 6. Following line 19 of one such ray, it intersects surface 9 at an angle $\phi$ and is thereupon refracted onto path 23. One recognizes that $\phi$ is less than the critical angle if the ray is to pass through boundary surface 9.

On the other hand, diffusely reflected rays from point 32, a point on relief pattern 29 which is illuminated but not in optical contact with surface 6, initially travel along path 33 only to be refracted onto line 34 upon entry into block 1. Because surfaces 6 and 9 are substantially perpendicular, and the index of refraction is defined to be greater than 1.414, incidence angle 36 is always greater than the critical angle. Thereby, rays of luminous energy originating on those segments of relief pattern 29 not in optical contact with surface 6 are totally reflected at surface 9. Though rays eminating from only two points have been described, the fundamental concept applies identically to all points on relief pattern 29. As will be further described hereinafter, there are geometric constrains on the locations of relief pattern 29.

For purposes of accentuating contrast at detector plane 16, the opaque absorbent coatings covering surfaces 2, 3 and 4 are black in color. Referring to the schematic in FIG. 4, when viewing boundary surface 9, whether it be along projection line 37, 38 or 39, the surface always takes on the black opaque finish of the coatings covering surfaces 2, 3 and 4. As shown, surface 3 is being observed. Nevertheless, the same is true at all angles so long as the index of refraction is greater than 1.414 and the corners of block 1 remain at substantially 90 degrees.

Figure 5:
FIG. 5 is a schematic representation of a fingerprint recorded by an apparatus similar to the one shown in FIG. 1.

It is the diffusely radiated luminous energy at the points of contact with surface 6, in combination with the otherwise opaque appearance at surface 9, which creates the exceptional contrast of the apparatus disclosed. FIG. 5 shows the high contrast actually obtained during preliminary investigation of the phenomenon. The drawing is a reproduction of a fingerprint photographically recorded with apparatus similar to that depicted in FIG. 1, though clearly lacking refinements such as optical correction of angular distortions. Nevertheless, the exceptional clarity and contrast is self-evident from the figure.

Recognizing that there exists geometric constraints which limit the locations of elements within detector assembly 11, including aperture plane 12 and lens 14, with respect to relief pattern 29, some analysis is necessary to define the boundaries. Take for instance FIG. 6, where relief pattern 29 is shown in optical contact with block 1, having a point P furthest from surface 9. If projection line 41 is defined to intersect surface 9 at an incident angle $\theta$, the critical angle, the limiting relationship between dimensions h and d may be ascertained. Geometrically, $\tan \theta = h/d$. From Snell's law and the given index of refraction, at 1.6, it is known that $\theta \leq$ arcsin (1/1.6) if a ray of luminous energy is to pass through surface 9 into detector assembly 11. Substitution leads to the relationship $$h \leq d \tan (\arcsin 1/1.6),$$

which when completed reduces to $$h \leq 0.8d.$$

Clearly then, dimensions d and h are related by a reasonably achievable factor.

Returning to the geometric relationships appearing in FIG. 2, it should be noted that the pattern appearing at image plane detector 16 will be distorted if further optical correction is not introduced. Naturally, the need and expense of added correction is directly related to the method and purpose of detection. For instance, if the detector merely recognizes an optical contact, or the detector consists of an assembly with multiple sensors, each responsive to a limited area on surface 6, further optical correction is superfluous. If, on the other hand, a pattern distributed over a large segment of surface 6 is to be electronically recognized, displayed or recorded, optical correction may be necessary. Fingerprints reproduction is a good example of the latter case.

Those practicing in the art recognize that various combinations of refractive and reflective optics differing from those shown may be readily substituted in the detector assembly. A reflective optical element is particularly apropos for the apparatus depicted in FIG. 2 since the image appearing at image plane detector 16 is optically reversed. However, if detector 16 is an instant film pack piece of photographic equipment which by its nature reverses the image, optical reversal is unnecessary. The fundamental structure disclosed is clearly amenable to a broad range of variations without digressing from the basic scope and spirit of the invention.

Those practicing in the related arts will recognize that imperfections internal to block 1, such as voids or contaminants, and imperfections in or contaminants on surface will produce luminous energy images at detector 16. Similarly, imperfections in the luminous energy absorbing capacity of the opaque coatings covering surfaces 2, 3 and 4 may appear as extraneous images, though their degree of contribution in the nominal case is minimal.

The apparatus as depicted in FIG. 1 is particularly well suited for photographically recording, with a reversing type instant film pack relief patterns having an extended area on a curvilinear surface, exemplified by the fingerprint. At the onset it should be noted that the method relies upon the inability of luminous energy to reach detector 16, the film, unless an object is brought into optical contact with surface 6 of block 1. In the case of the fingerprint, as with other relief patterns, rolling the finger about its longitudinal axis over the sensing area of surface 6 selectively exposes the film by causing luminous energy to reach the film only from points of optical contact. Note that the print reproduced in FIG. 5 merely shows a flat contact.

The invention contemplates significantly broader applications than fingerprint pattern recording or recognition. Block 1 need not be rectilinear in shape, nor need surface 6 be confined to its planar configuration. Likewise, the indices of refraction at each boundary surface are amenable to changes, as are the natures of luminous energy source 8 and detector assembly 11.

Quite expectedly though, the optical design becomes more complicated. The refractive characteristics at each boundary surface would have to be considered since the above noted index, $n > 1.414$, is limited to the simple rectilinear case with air as the external medium.

Continuing, the apparatus as embodied is responsive in the visual segment of the electromagnetic spectrum. The invention in its broad sense encompasses the full breadth of the electromagnetic spectrum, whenever refraction and internal reflection are joined with materials having selected indices of refraction to detect contacts between an external object and a boundary surface.

I claim:

1. An apparatus for detecting contact between an object and a boundary surface, comprising:
   a. a body transmissive to electromagnetic energy having an index of refraction n and at least four boundary surfaces;
   b. a first medium transmissive to electromagnetic energy, in contact with the first boundary surface, the first medium having an index of refraction $n_1$;
   c. a source of electromagnetic energy in the first medium transmitting in the direction of the first boundary surface;
   d. a second medium transmissive to electromagnetic energy, in contact with the second boundary surface, the second medium having an index of refraction $n_2$;
   e. a means for detecting electromagnetic energy passing through the second boundary, located in the second medium;
   f. a third medium transmissive to electromagnetic energy, in contact with the third boundary surface, the third medium having an index of refraction $n_3$;
   g. a relationship between the indices of refraction n, $n_1$ and $n_2$ such that at the first and second boundary surfaces the electromagnetic energy entering the first boundary surface is refracted to intersect the second boundary surface at an angle greater than the critical angle, undergoing substantially total internal reflection at the second boundary surface;
   h. a relationship between the indices of refraction n, $n_2$ and $n_3$ such that at said second and third boundary surfaces the electromagnetic energy entering the third boundary surface is refracted to intersect the second boundary surface at an angle greater than the critical angle, undergoing substantially total internal reflection at the second boundary surface;
   i. the fourth boundary surface of the body being highly absorbent to incident electromagnetic energy in the region geometrically conjugate to the means for detecting; and
   j. the third boundary surface diffusely reflects incident electromagnetic energy internal to the body from all points where an object located in the third medium makes contact with the third boundary surface, and where some of this diffusely reflected energy is incident on the second boundary surface at less than the critical angle.

2. The apparatus as recited in claim 1, wherein the boundary surfaces are substantially planar, the second boundary surface is substantially perpendicular to both the first and third boundary surfaces, and the first and third boundary surfaces are substantially parallel to each other.

3. The apparatus as recited in claim 2, wherein all boundary surfaces excepting the first, second and third are highly absorbent to electromagnetic energy incident thereupon from within the body.

4. The apparatus as recited in claims 1, 2 or 3, wherein the apparatus operates in the visible band of the electromagnetic spectrum.

5. The apparatus as recited in claim 4, wherein the detection means is responsive to the cumulative electromagnetic energy diffusely reflected from any area on the third boundary surface.

6. The apparatus as recited in claim 4, wherein the detection means comprises an imaging system, to substantially reproduce an image of the electromagnetic energy diffusely reflected from said third boundary surface, and a pattern recognition sensor.

7. The apparatus as recited in claim 6, wherein the indices of refraction $n_1$, $n_2$ and $n_3$ are approximately one, where said body is a solid rectilinear piece of transparent material having an index of refraction greater than 1.414, and where the absorbent boundary surfaces are formed by opaque coatings on the exterior surfaces of the body.

8. The apparatus as recited in claim 7, wherein the detection means further comprises a luminous energy excluding enclosure over the second boundary surface, an imaging system for optically correcting distortion in the image, and an unexposed film at the image plane, which film is responsive to the luminous energy generated by the visual band electromagnetic energy source.

* * * * *